Oct. 27, 1970   L. D. FERSTLE   3,535,957
COLLETING FIXTURE
Filed Feb. 1, 1968
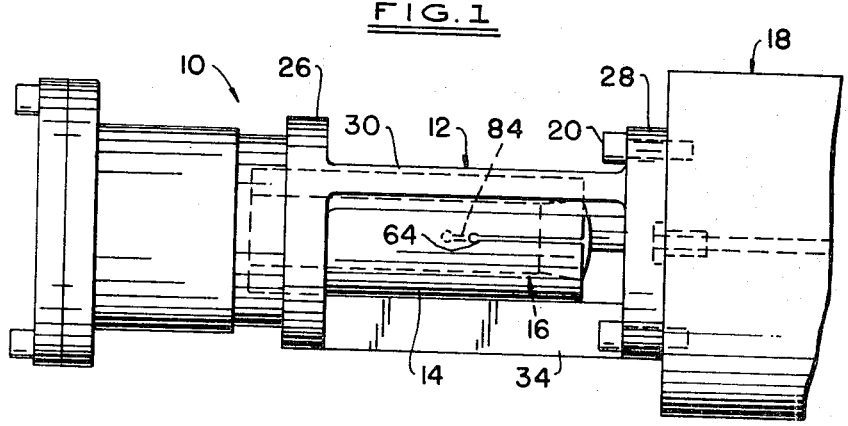
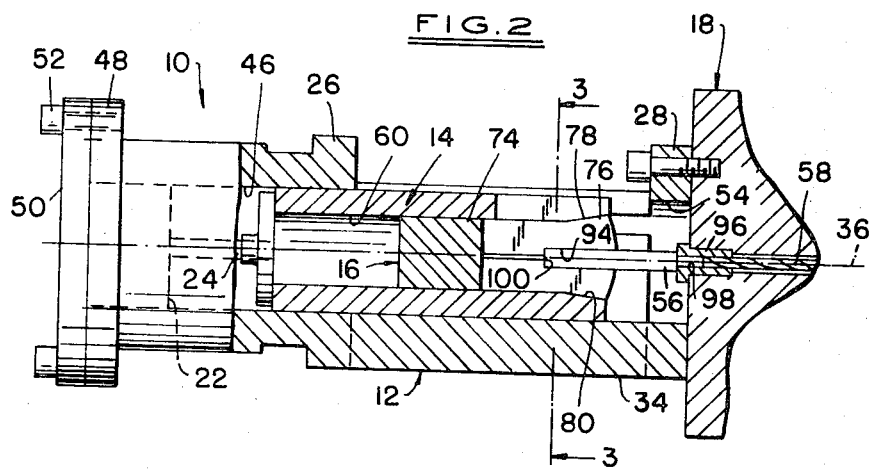
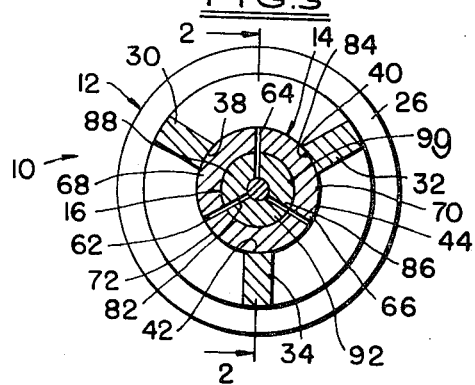
INVENTOR
LEO D. FERSTLE
BY
Whittemore, Hulbert &
Belknap   ATTORNEYS

United States Patent Office 3,535,957
Patented Oct. 27, 1970

3,535,957
COLLETING FIXTURE
Leo D. Ferstle, 16200 Fairview Crescent Blvd.,
Southfield, Mich. 48075
Filed Feb. 1, 1968, Ser. No. 702,259
Int. Cl. B23b 47/28
U.S. Cl. 77—63        10 Claims

ABSTRACT OF THE DISCLOSURE

The colleting fixture is for the purpose of holding a workpiece for machining in a machine tool such as an automatic screw machine, lathe, and the like. The fixture may be mounted in either the vertical or horizontal position. The fixture comprises three basic elements for gripping the workpiece. A tubular outer housing having a bore therein is fixedly mounted on the machine tool. The outer housing receives a radially expandable intermediate gripping member which is axially movable therein. The intermediate member receives a radially expandable work-holding member. The work-holding member is configured to wedge into the intermediate member when driven in one direction.

---

The work-holding member is adapted to receive a workpiece. Stop means are provided interiorly of this member to position the workpiece therein. Drive means are provided to move the intermediate member axially within the outer housing. The intermediate member carries with it the work-holding member. Stop means are provided exteriorly of the outer housing for engagement with the workpiece. Engagement of the workpiece with said last-mentioned stop means results in the work-holding member contracting radially into gripping engagement with workpiece and the intermediate member expanding radially into gripping engagement with the outer housing.

BACKGROUND OF THE INVENTION

It is frequently desired, in machining operations, to accurately hold and center a workpiece with respect to a cutting tool. For example, it may be necessary to drill one or more holes in one end of a cylindrical workpiece. The positionment of such holes is normally determined with respect to the axis and outer periphery of the workpiece. If the axis of the workpiece is accurately located, the drilling tool may be located radially with respect to the known position of the axis. Similarly, if the workpiece is to be rotated and the outer periphery thereof machined as in a lathe, the workpiece should rotate exactly about its axis.

In many prior art devices, the workpiece has been held in a fixture which has consisted of a single work gripping member or a work gripping member in combination with a second member which has acted to locate and grip the work gripping member. In either case, difficulty has been encountered in accurately centering the workpiece.

The present invention represents an improvement over such prior art structures in that the colleting fixture includes three members, two of which are radially expandable or contractable to accurately locate and grip the workpiece, with the third member acting as a fixed centering device. The unit, overall, functions in a manner to be self-centering.

SUMMARY OF THE INVENTION

A colleting fixture is provided for mounting on a machine tool. The fixture comprises an outer housing which is fixedly mounted on the machine tool. The outer housing has a bore which slidingly receives an intermediate gripping member. The intermediate gripping member has an external surface which mates with the interior surface of the bore of the outer housing. The intermediate gripping member has a bore which slidably receives a work gripping member. A work gripping member has an external surface which mates with the interior surface of the bore of the intermediate gripping member. The work gripping member has a bore for reception of a workpiece. The interior surface of the bore of the work gripping member mates with the external surface of the workpiece to be received. A first stop member is provided in the bore of the work gripping member to limit the extent of insertion of a workpiece therein. A second stop member is provided on the machine tool to limit movement of the work gripping member in the direction of the second stop means. Power means are mounted on the outer housing to drive the intermediate gripping member towards the second stop member. At least a portion of the exterior surface of the work gripping member and a portion of the interior surface of the bore of the intermediate gripping member have mating tapers for wedging engagement with each other. The portions of said members contiguous with tapered portions are longitudinally slitted so that thse portions are radially expandable and contractable. Driving of the intermediate gripping member towards the second stop member causes the intermediate gripping member and work gripping member to wedgingly engage each other. This results in contraction of the work gripping member to grip a workpiece and expansion of the intermediate gripping member to grip the outer housing. The wedging of the work gripping member and intermediate gripping member results in these members gripping each other.

In the drawing:

FIG. 1 is a side elevational view of one embodiment of the colleting fixture of the present invention illustratively mounted on a gun drilling machine;

FIG. 2 is a side elevational view in section of the fixture of FIG. 1 taken substantially along the line 2—2 of FIG. 3 looking in the direction of the arrows; and, FIG. 3 is a cross-sectional view of the fixture taken substantially along the line 3—3 of FIG. 2 looking in the direction of the arrows.

Referring to the drawings, it will be noted that the colleting fixture 10 includes a tubular outer housing 12 which receives a tubular intermediate sleeve 14 which in turn receives a work-gripping member 16. The outer housing 12 is secured to a gun drilling machine 18 by means of bolt structures 20. The outer housing 12 carries, on its outer end, a power cylinder 22 which has a piston rod 24 in engagement with the intermediate sleeve 14 to drive the sleeve to the right as viewed in FIGS. 1 and 2 and retract the sleeve to the left as viewed in these figures.

The outer housing 12 comprises a pair of end pieces 26, 28 which are interconnected by a plurality of elongated bars 30, 32, 34, illustratively three in number. The bars 30, 32, 34 are spaced around the outer periphery of the end pieces 26, 28 equidistant from the longitudinal axis of the housing illustrated by the dotted line 36 to thus lie in an imaginary cylinder configured around this axis. As shown in FIG. 3, the inner surfaces 38, 40, 42 of the bars 30, 32 34 are curved to mate with the cylindrical outer surface 44 of the intermediate sleeve 14.

The end piece 26 is a cylindrical member having a central bore 46 to receive the cylinder 22. A peripheral flange 48 is provided on the outer end of the end piece 26. A disc member 50 to which the cylinder 22 is attached is secured to the flange 48 by means of bolt strutcures 52. The other end piece 28 is disc-shaped and has a central opening 54 to permit engagement of a workpiece 56 with a drill bit 58.

The intermediate sleeve 14 is a cylindrical member having a central bore 60. Longitudinally extending slots 62, 64, 66 are provided in the forward portion of the intermediate sleeve 14. The slots extend from the forward edge of the sleeve and terminate at a point short of the longitudinal center of the sleeve. It will be noted that the slots are angularly spaced an equidistant amount around the periphery of the sleeve 14. It will be appreciated that the segments 68, 70, 72 between the slots are free to expand or contract in the radial direction.

The work gripping member 16 comprises a cylindrical portion 74 having an outer diameter equal to the inner diameter of the bore 60 of the intermediate sleeve 14. The forward end 76 is enlarged and has a conical exterior surface 78 which tapers radially inwardly from the forward end of the member towards the cylindrical portion 74. A mating conical recess 80 is provided in the forward end of the intermediate sleeve 14 to wedgingly receive the enlarged portion 76. As in the case of the intermediate sleeve 14, equally spaced longitudinally extending slots 82, 84, 86 are provided in the forward portion of the work gripping member 16.

It will be noted that the slots 82, 84, 86 are longer than the slots 62, 64, 66. The length of the slots depends upon the gripping action desired. Again, it will be appreciated that the segments 88, 90, 92 may expand and contract radially.

A cylindrical recess 94 is provided in the forward portion of the work gripping member. The axis 36 is the longitudinal axis of the recess 94 as well as of the bore 60 of the intermediate sleeve 14 and of the cylinder defined by the bars 30, 32, 34, whereby all of the surfaces and bores are concentric one with the other. It will be noted that the recess 94 is deep enough to receive a sufficient amount of the cylindrical workpiece 56 to satisfactorily hold this workpiece with a portion thereof extending outwardly for the machining operation.

A drill bushing 96 is provided on the gun drilling machine 18 in alignment with the workpiece 56. The drill bushing 96 has a central bore 98 the axis of which is the same as the axis 36. The drill bit 58 is received in the bore 98 of the bushing 96. The drill bit 98 is extendible and retractable and is rotated by conventional means (not shown).

Operation of the colleting fixture may now be understood. In the initial position, the intermediate sleeve 14 is retracted to the left as viewed in FIGS. 1 and 2 by means of the power cylinder 22. The workpiece 56 is inserted into the recess 94. The openings between the bars 30, 32, 34 in the outer housing permit access to the work gripping member 16 for loading and unloading of workpieces. After the workpiece 56 has been mounted, the power cylinder 22 is actuated thus driving the intermediate sleeve 14 to the right. The sleeve 14 carries with it the work gripping member 16 and workpiece 56. The drill bushing 96 serves as a stop member for travel of the workpiece 56. When the workpiece 56 contacts the drill bushing its forward motion is terminated. The work gripping member 16 may continue traveling for a short distance until the workpiece 56 contacts the bottom 100 of the recess 94 which defines a stop surface. Longitudinal movement of the work gripping member 16 then ceases. The intermediate sleeve 14 then continues its forward motion for a short distance causing wedging engagement of the forward end 76 of the work gripping member 16 with the conical recess 80. This wedging engagement results in forcing the segments 88, 90, 92 radially inwardly to firmly grip the workpiece 56. At the same time, the segments 68, 70, 72 of the intermediate sleeve 14 are forced radially outwardly to firmly grip the bars 30, 32, 34. These gripping actions prevent relative rotation of the various parts. The drill bit 58 is then actuated to drill a hole in the end of the workpiece 56. To release the workpiece, the power cylinder 22 is activated to drive the intermediate sleeve 14 to the left whereupon workpiece 56 may be gripped by the operator and removed from the work gripping member 16 through an opening between the bars in the outer housing.

The gripping action of the intermediate sleeve and work gripping member 16 results in self centering of the workpiece 56. The provision of two radially contractable and expandable gripping elements, namely, the intermediate sleeve 14 and work gripping member 16, results in a flexibility of motion permitting proper seating of the workpiece 56. This results in the workpiece being exactly concentric with respect to the various components and thus avoids drilling of an opening therein which is eccentric to the outer periphery of the workpiece. The same principle holds true if the workpiece is to be machined exteriorly as in a lathe.

What is claimed as my invention is:

1. A colleting fixture comprising an outer housing having a bore therein, an intermediate gripping member slidingly received in said bore and having an external surface mating with the interior surface thereof, said intermediate gripping member having a bore therein, a work gripping member slidably received in the bore of the intermediate gripping member and having an external surface mating with the interior surface thereof, stop means in said work, gripping member to limit sliding of work gripping member within the intermediate gripping member, said work gripping member having a bore therein for reception of a workpiece, the interior surface of the bore of the work gripping member mating with the external surface of the workpiece to be received, at least a portion of the exterior surface of the work gripping member and a portion of the interior surface of the bore of the intermediate gripping member having a mating taper for wedging engagement with each other, the portions of said members contiguous with said tapered portions being radically expandable and contractable whereby forcing of the two members into wedging engagement with each other results in contraction of the work gripping member to grip a workpiece and expansion of the intermediate gripping member to grip the outer housing, the wedging of the work gripping member resulting in these members gripping each other.

2. A fixture as defined in claim 1 and further characterized in that the outer housing, intermediate gripping member, and work gripping member have concentric axes.

3. A fixture as defined in claim 1 and further characterized in that each of the bore of the outer housing, the external surface of the intermediate gripping member, the bore of the intermediate gripping member, the external surface of the work gripping member, and the bore of the work gripping member are circular in cross-section.

4. A fixture as defined in claim 1 and further characterized in the provision of power means to drive the intermediate gripping member into wedging engagement with the work gripping member.

5. A fixture as defined in claim 1 and further characterized in that said stop means comprises first stop means in the bore of the work gripping member to limit the extent of insertion of a workpiece therein, and being cooperable with second stop means exteriorly of the work gripping member to contact a workpiece and limit movement of the work gripping member in the direction of said second stop means to thereby cause wedging engagement of the intermediate gripping member and work gripping member upon movement of the intermediate gripping member and work gripping member toward said second stop means.

6. A colleting fixture comprising an outer housing having a bore therein, an intermediate gripping member slidingly received in said bore and having an external surface mating with the interior surface thereof, said intermediate gripping member having a bore therein, a work gripping member slidably received in the bore of the intermediate gripping member and having an external surface mating with the interior surface thereof, said work gripping member having a bore therein for reception of a workpiece, first stop means within the bore of the work gripping member to limit insertion of a workpiece therein, second stop means located exteriorly of the work gripping member to contact said workpiece and limit movement of the work gripping member in the direction of said second stop means, power means to drive the intermediate gripping member towards said second stop means, the interior surface of the bore of the work gripping member mating with the external surface of the workpiece to be received, at least a portion of the exterior surface of the work gripping member and a portion of the interior surface of the bore of the intermediate gripping member having a mating taper for wedging engagement with each other, the portions of said members contiguous with said tapered portions being radially expandable and contractable whereby forcing of the two members into wedging engagement as a result of actuation of said power means results in contraction of the work gripping member to grip a workpiece and expansion of the intermediate gripping member to grip the outer housing, the wedging of the work gripping member and intermediate gripping member resulting in these members gripping each other.

7. A device as defined in claim 6 and further characterized in that the axes of the outer housing, intermediate gripping member and work gripping member are concentric.

8. A fixture as defined in claim 6 and further characterized in that said intermediate gripping member and work gripping member have longitudinally extending slots therein extending from the forward portions thereof defining segments therebetween which result in the portion of said members which are radially expandable and contractable.

9. A fixture as defined in claim 5 and further characterized in that the outer housing has opening means in the wall thereof to permit insertion of a workpiece into the work gripping member.

10. The combination of a machine tool and a colleting fixture comprising an outer housing fixedly mounted on a machine tool, said outer housing having a bore therein, an intermediate gripping member slidingly received in said bore and having an external surface mating with the interior surface thereof, said intermediate gripping member having a bore therein, a work gripping member slidably received in the bore of the intermediate gripping member and having an external surface mating with the interior surface thereof, said work gripping member having a bore therein for reception of a workpiece, a first stop member within the bore of the work gripping member to limit the extent of insertion of a workpiece thereinto, the interior surface of the bore of the work gripping member mating with the external surface of the workpiece to be received, a second stop member mounted on the machine tool for contact with a workpiece upon movement of the work gripping member towards the second stop member to thereby limit the extent of movement of the work gripping member in the direction of the second stop member, at least a portion of the exterior surface of the work gripping member and a portion of the interior surface of the bore of the intermediate gripping member having a mating taper for wedging engagement with each other, the portions of said members contiguous with said tapered portions being radially expandable and contractable, power means mounted on the outer housing and connected to the intermediate gripping member for driving of this member towards the second stop member, driving of the intermediate gripping member toward the second stop member causing the intermediate gripping member and work gripping member to move into wedging engagement with each other and result in contraction of the work gripping member to grip a workpiece and expansion of the intermediate gripping member to grip the outer housing, the wedging of the work gripping member and intermediate gripping member resulting in these members gripping each other.

References Cited

UNITED STATES PATENTS 2,619,174  11/1952  Neale _____ 279—43 XR

FRANCIS S. HUSAR, Primary Examiner

U.S. Cl. X.R.

279—4, 43, 50.